(12) United States Patent
Eskandari et al.

(10) Patent No.: US 12,485,552 B2
(45) Date of Patent: Dec. 2, 2025

(54) REMOTE PHYSIOLOGICAL DATA SENSING ROBOT

(71) Applicant: Serve Operating Co., Redwood City, CA (US)

(72) Inventors: Hani Eskandari, Vancouver (CA); Ali Haghighat Kashani, San Francisco, CA (US); Sean Tracey Plaice, San Francisco, CA (US); Bastian Jan Michael Lehmann, San Francisco, CA (US)

(73) Assignee: Serve Operating Co., Redwood City, CA (US)

( * ) Notice: Subject to any disclaimer, the term of this patent is extended or adjusted under 35 U.S.C. 154(b) by 296 days.

(21) Appl. No.: 17/627,577

(22) PCT Filed: Jul. 16, 2020

(86) PCT No.: PCT/US2020/042351
§ 371 (c)(1),
(2) Date: Jan. 14, 2022

(87) PCT Pub. No.: WO2021/011784
PCT Pub. Date: Jan. 21, 2021

(65) Prior Publication Data
US 2022/0281117 A1    Sep. 8, 2022

Related U.S. Application Data

(60) Provisional application No. 62/874,611, filed on Jul. 16, 2019.

(51) Int. Cl.
*B25J 11/00*     (2006.01)
*B25J 9/16*      (2006.01)
(Continued)

(52) U.S. Cl.
CPC .......... *B25J 11/0005* (2013.01); *B25J 9/163* (2013.01); *B25J 11/0015* (2013.01);
(Continued)

(58) Field of Classification Search
CPC .... B25J 11/0005; B25J 9/163; B25J 11/0015; B25J 19/023; G06F 3/015;
(Continued)

(56) References Cited

U.S. PATENT DOCUMENTS

2015/0314454 A1* 11/2015 Breazeal ................. G10L 15/32
                                                              700/259
2017/0011258 A1   1/2017 Pitre et al.
(Continued)

FOREIGN PATENT DOCUMENTS

| JP | 2005237569 A | * | 9/2005 | .......... A61B 5/0507 |
| JP | 2015150620 A |   | 8/2015 |                        |
| JP | 3219447 A1   |   | 9/2017 |                        |

OTHER PUBLICATIONS

WIPO English translation of JP-2005237569-A. (Year: 2005).*
(Continued)

Primary Examiner — Jason Holloway
Assistant Examiner — Christopher A Buksa
(74) Attorney, Agent, or Firm — Weaver Austin Villeneuve & Sampson LLP

(57) ABSTRACT

Techniques described in this application are directed to an autonomous robot that is configured to interact with its environment through identifying the presence and emotional state (e.g., mood) of live subjects in the scene. The autonomous robot includes one or more remote physiological data collecting sensors capable of remotely collecting physiological data such as heart rate, blood circulation, or respiratory activity of the live subjects within close proximity of the robot.

20 Claims, 4 Drawing Sheets

(51) Int. Cl.
  *B25J 19/02*  (2006.01)
  *G06F 3/01*  (2006.01)
(52) U.S. Cl.
  CPC ............ *B25J 19/023* (2013.01); *G06F 3/015* (2013.01); *G06F 2203/011* (2013.01)
(58) Field of Classification Search
  CPC ..... G06F 2203/011; A61B 5/01; A61B 5/024; A61B 5/0816; A61B 5/165
  See application file for complete search history.

(56) References Cited

U.S. PATENT DOCUMENTS

| | | |
|---|---|---|
| 2018/0257219 A1 | 9/2018 | Oleynik |
| 2018/0354129 A1 | 12/2018 | Yuzawa et al. |
| 2019/0202060 A1 | 7/2019 | Aaron et al. |
| 2020/0138356 A1* | 5/2020 | Sharon ................. A61B 5/0205 |

OTHER PUBLICATIONS

PCT International Search Report and Written Opinion mailed Oct. 1, 2020; PCT/US20/42351.
Uchida, Mihiro, et al., "Image-based measurement of changes to skin texture using piloerection for emotion estimation", *Artificial Life and Robotics* 24(1):12-18 (2019), section 1 "Introduction", published May 16, 2018 <DOI: 10.1007/s10015-018-0435-0>.

* cited by examiner

REMOTE PHYSIOLOGICAL DATA SENSING ROBOT

CROSS-REFERENCES TO RELATED APPLICATIONS

This application is a U.S. national phase under 35 U.S.C. § 371 of International Application No. PCT/US20/42351, filed Jul. 16, 2020, entitled "Remote Physiological Data Sensing Robot", which claims priority to and the benefit of U.S. Provisional Patent Application No. 62/874,611, filed Jul. 16, 2019, entitled "Physiologic Detection Sensing Robot", the disclosures of which are incorporated herein by reference in their entireties for all purposes.

BACKGROUND

Robots can serve many functions that can improve efficiency and solve problems in situations where human effort can be better spent. For example, a robot can be built to transport physical items and deliver the items to recipients. A robot may have to interact with humans who may send and/or receive goods transported by the robot. A robot that interacts with humans may face various challenges during the interaction with a human. For example, the robot may not be able to understand what a person wants from it, and this may result in the person getting frustrated.

As the robot travels among humans and animals (e.g. dogs), some humans and animals may not react positively to the robot. If the robot cannot detect the emotional state of the people and/or animals in its surroundings, the robot may not be able to property interact with, or protect itself from, the people and animals.

The key to a successful robot-environment interaction is for the robot to know the presence of the human or animals in its proximity, identify their position and pose and understand their behavior and emotions. Achieving all these is presently a challenge in the fields of robotics and computer vision. Especially understanding human emotions, feelings and mood using traditional sensors used in robots such as cameras and radars has proven to be extremely difficult and subject to misclassification.

Embodiments address these and other problems individually and collectively.

BRIEF SUMMARY

The present application relates to robotics and artificial intelligence. More specifically, the present application relates to a system and method for improving human-robot interaction by enabling the robot to detect the emotional state of the humans and animals surrounding the robot using a trained machine learning algorithm executing on the robot.

Various embodiments provide a robot comprising one or more sensors configured to collect sensor data by remotely measuring one or more physiological functions of at least one live subject, one or more output devices, one or more processors; and a non-transitory computer-readable medium including instructions that, when executed by the one or more processors, cause the one or more processors to: identify the at least one live subject within a predetermined distance of the robot; receive, from the one or more sensors, the sensor data associated with the one or more physiological functions of the at least one live subject; determine an emotional state of the at least one live subject using at least the sensor data; determine a robot action based on the emotional state of the at least one live subject; provide, to the one or more output devices, an instruction to initiate the robot action; and perform the robot action using the one or more output devices.

In some embodiments, the robot may further include one or more video cameras. The instructions, when executed by the one or more processors, further cause the one or more processors to: capture image data of the at least one live subject using the one or more video cameras; correlate the sensor data with the image data; and determine the emotional state of the at least one live subject using correlation between the sensor data and the image data.

Embodiments also provide a method comprising identifying, by a robot, at least one live subject within a predetermined distance of the robot, and collecting, by the robot, sensor data by remotely measuring one or more physiological functions of the at least one live subject, wherein the at least one live subject is a person or an animal. The method further includes determining, by the robot, an emotional state of the at least one live subject using at least the sensor data; and determining, by the robot, a robot action based on the emotional state of the at least one live subject. The method also includes providing, by the robot to one or more output devices of the robot, an instruction to initiate the robot action; and performing, by the robot, the robot action using the one or more output devices.

Further details regarding embodiments can be found in the Detailed Description and the Figures.

BRIEF DESCRIPTION OF THE DRAWINGS

Illustrative examples are described in detail below with reference to the following figures.

DETAILED DESCRIPTION

Figure 1:
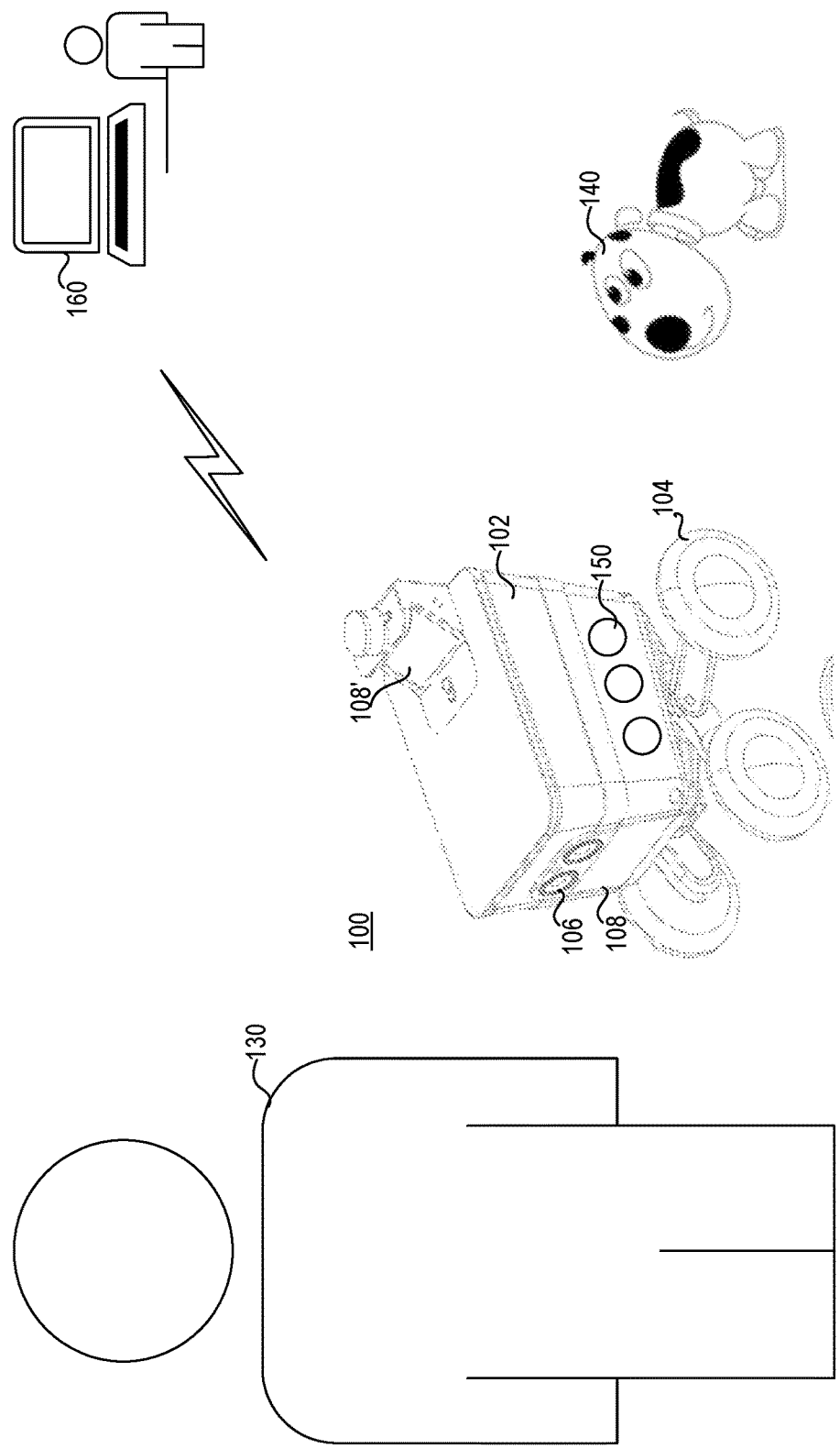
FIG. 1 illustrates a block diagram illustrating an example of a robot with one or more physiological data detection sensors according to an embodiment of the disclosure.

Embodiments provide a robot that is configured to interact with its environment through identifying the presence and emotional state (e.g. mood) of the live subjects in the scene. The robot includes at least one sensor that is capable of remotely measuring physiologic functions such as the heart rate, blood circulation or respiratory activity of the live subjects within a predetermined distance of the robot.

The description provided herein includes illustrative embodiments only and is not intended to limit the scope, applicability, or configuration of the disclosure. Rather, the description will provide those skilled in the art with an enabling description for implementing a preferred exemplary embodiment. It is understood that various changes can be made in the function and arrangement of elements without departing from the scope as set forth in the claims.

Embodiments provide a robot that is adapted to interact with humans in close proximity of the robot. Herein, "robot" may also be referred to as "autonomous robot". According to various embodiments, the robot may be a delivery robot and may transport physical items in areas traversed by live subjects such as people and animals (e.g. pedestrians and dogs on sidewalks). For example, the delivery robot can be configured to transport food or goods from a store to a delivery driver waiting at the curb or directly to the recipient of the food or goods. As another example, the delivery robot can be configured to deliver documents from one floor in a building to another, or from one building to another. As another example, the delivery robot can be configured to carry emergency medical supplies and/or equipment, and can be programmed to drive to the scene of an emergency.

In various examples, the robot may interact with one or more live subjects (e.g. persons, dogs, other animals) in close proximity of the robot. For example, the robot may be delivering goods to a recipient. When the robots reaches the recipient, the recipient may have to perform a series of actions before retrieving the goods from a cargo area of the robot. However, the person may not be able to follow the instructions and, consequently, may become increasingly irritated and/or frustrated. According to various embodiments, the robot may be equipped with one or more physiological data collecting sensors that may be able to collect data about physiological functions (e.g. heart rate, body temperature, breathing rate) of the person. The robot may also store an algorithm (e.g. a machine learning model) that may be able to correlate the sensor data among themselves, or with image data received from one or more cameras coupled to the robot. The algorithm may then identify an emotional state of the person (e.g. mood) and determine a robot action in response to the person's emotional state. For example, if the algorithm determines that the person is getting frustrated, the algorithm may recommend that the robot display a set of lights on a display device to mimic a human expression (e.g. smiley face, winking eye), play a recording (e.g. music or a message), contact a remote operator (e.g. a customer service agent, a technical operator that can control the robot remotely) or activate vehicle systems that will move the robot.

In some examples, a successful robot-environment interaction may include the robot detecting the presence of a human, animal, or any live subject in its proximity, identify their position and pose, and determine the behavior and emotions of the human or animal. Determining each of these from sensor data is presently a challenge in the fields of robotics and computer vision. Especially understanding human emotions, feelings, and mood using traditional sensors used in robots, such as cameras and radars, has proven to be extremely difficult and subject to misclassification.

This disclosure describes a system that enables the detection of humans or animals in the vicinity of an autonomous robot, identifies their state or mood, and makes a decision or takes an action based on such assessment.

Various different embodiments will be discussed next.

FIG. 1 is a block diagram illustrating an example of a robot (e.g. a sidewalk robot or a delivery robot) with physiological data detection sensors according to an embodiment of the disclosure. For example, the robot 100 may include features similar to those described in PCT Application No. PCT/US2019/054867 filed on Oct. 4, 2019 and its related applications, which are incorporated by reference for all purposes.

As provided above, according to various embodiments, the robot may be in form of a delivery robot. FIG. 1 illustrates an exemplary delivery robot in close proximity to a person and a dog according to various embodiments. The robot 100 includes a body 102 and a set of wheels 104 that enable the robot 100 to travel across surfaces (e.g. along a sidewalk). The robot 100 can further include a lighting system 106, for example located in the front of the robot, which can be lit in various configurations to indicate different information to a person 130 in proximity of the robot 100. For example, the lighting system 106 may be controlled to mimic a human expression (e.g. winking/blinking). The robot 100 can further include one or more display device(s) 108, 108' positioned on, for example, on a top and/or a front surface of the robot 100. In various examples, the display device(s) 108, 108' can be used to communicate information to a person 130 viewing the screen, or to display further human expressions (e.g. smiley face).

According to various embodiments, the robot's body 102 can further include a cargo area, or multiple cargo areas with different access points. The robot 100 can further include an onboard or internal computing device (described below in greater detail in connection with FIG. 2), which travels with the robot 100, is programmed to control the operations of the robot, can execute a trained machine learning algorithm and can receive instructions for the robot 100 over wired and/or wireless connections with a remote computing device 160, such as a laptop computer, a desktop computer, a smartphone, or another type of computer. The computing device 160 is "remote" in that the computing device is not mounted to the robot 100 and does not travel with the robot 100. According to various embodiments, the onboard computing device may include a wireless networking capability, and thus may be able to receive the instructions over a Wi-Fi and/or a cellular signal. The robot 100 can further include internal components for power, propulsion, steering, location tracking, communication, and/or security, among other examples. For example, the robot 100 can include rechargeable batteries and a motor.

According to various embodiments, the robot 100 may include one or more physiological data collecting sensors 150 configured to collect sensor data by remotely measuring one or more physiological functions of a live subject (e.g. a person 130 or an animal 140) in close proximity of the robot 100. For example, the person 130 may interact with the robot 100 to retrieve information or a physical package from the robot 100. The person 130 may become increasingly frustrated if she/he cannot interpret the instructions to properly interact with the robot 100. The robot 100 may monitor the physiological functions of the person 130 (or the animal 140) during the entire period of time that the person 130 is in proximity of the robot 100. According to various embodiments, the robot 100 may monitor a plurality of live subjects at the same time.

The onboard or internal computing device of the robot 100 may execute an algorithm that may determine an emotional state of the person 130 based on a series of sensor data associated with the physiological functions of the person 130 measured at predetermined intervals. Said algorithm may or may not utilize a machine learning model. The algorithm may determine a robot action that may be implemented using an output device (e.g. a display screen, speakers, vehicle systems, wheels, etc.) of the robot 100. For example, the robot action may include displaying a human expression, displaying a text message, playing a recording, contacting a customer service agent who can speak with the person 130, contacting a remote operator for moving the robot 100, executing the vehicle systems to move the robot 100, etc. The onboard or internal computing device of the robot 100 may then implement the robot action and continue monitoring the physiological functions of the person 130.

In some embodiments, the robot 100 may collect the physiological measurements of the animal 140 (e.g. a dog)

in close proximity. For example, the algorithm executed by the onboard or internal computing device of the robot 100 may determine that the animal 140 is getting agitated by the presence of the robot 100 and may determine an appropriate robot action based on the physiological measurements of the animal 140.

Figure 2:
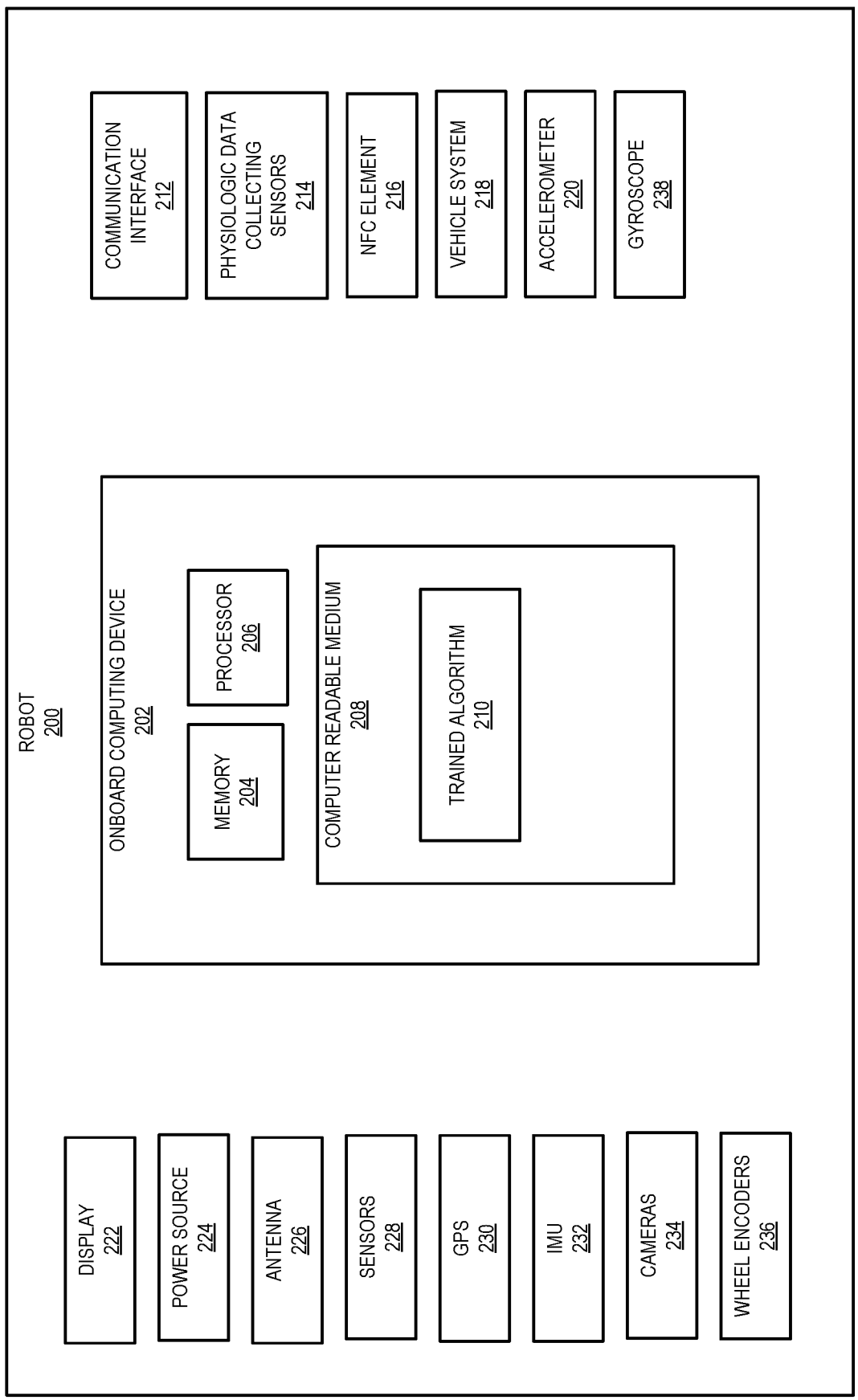
FIG. 2 illustrates a block diagram illustrating exemplary components of a robot according to an embodiment of the disclosure.

FIG. 2 is a block diagram illustrating exemplary components of a robot according to an embodiment of the disclosure. In one example, the robot 200 includes an onboard computing device 202 that may include a memory 204, a processor 206 and a computer readable medium 208 storing computer executable instructions. The computer readable medium 208 may also store a trained learning machine model (e.g. algorithm) 210.

The memory 204 may be any suitable device or devices that can store electronic data and code. The memory 204 may be coupled to the processor 206 internally or externally (e.g., cloud-based data storage), and may comprise any combination of volatile and/or non-volatile memory, such as RAM, DRAM, ROM, flash, or any other suitable memory device. Examples of memories may comprise one or more memory chips, disk drives, etc. Such memories may operate using any suitable electrical, optical, and/or magnetic mode of operation.

The processor 206 may control the operation of the robot 200 and may comprise one or more Application Specific Integrated Circuits (ASICs) or Field Programmable Gate Arrays (FPGAs). The processor 206 may include single core and/or multicore processors. The processing resources of the robot 200 may be organized into one or more processing units. A processing unit may include one or more processors, one or more cores from the same or different processors, a combination of cores and processors, or other combinations of cores and processors. In some embodiments, the processor 206 may include one or more special purpose co-processors such as graphics processors, Digital Signal Processors (DSPs), or the like. In some embodiments, the processor 206 may be implemented using customized circuits.

In some embodiments, the processor 206 may execute instructions stored on the computer readable medium 208. In various embodiments, the processor 206 may execute a variety of programs or code instructions and may maintain multiple concurrently executing programs or processes. At any given time, some or all of the program code to be executed may be resident on the computer readable medium 208 including potentially on one or more storage devices. Through suitable programming, the processor 206 may provide various functionalities described herein.

Still referring to FIG. 2, the robot 200 may also include one or more of a display 222, a power source 224 (e.g., a battery) for allowing the robot 200 to self-drive, one or more sensors 228 (e.g., LIDAR (e.g., Light Detection And Ranging) sensors, ultrasonic range sensors, bump sensors), a global positioning system (GPS) transmitter/receiver 230, an inertial measurement unit (IMU) 232 (capable of measuring force, angular rate, and orientation of the delivery robot), one or more cameras 234 (e.g., computer vision cameras, stereo-cameras, depth cameras), wheel encoders 236, an antenna 226 to communicate with the GPS or other computer systems.

The robot 200 also includes one or more physiological data collecting sensors 214 configured to remotely capture physiological measurements of at least one live subject (e.g. person or animal) in close proximity to the robot 100. The physiological data collecting sensors 214 may be distributed around the body of the robot 200 to be able to collect data from live subjects located at various positions around the robot. The physiological data collecting sensors 214 may be configured to collect physiological data from multiple live subjects in real time. According to various embodiments, the physiological data collecting sensors 214 may remotely measure one or more of a heart rate, a body temperature, a blood circulation or a respiratory activity of the live subject. The physiological data collecting sensors 214 may use technologies such as microwave, Doppler and ultra-wideband and electromagnetic radio-frequency (RF) signals with frequencies in the range of 700 MHz-100 GHz to remotely collect physiological measurements. The slight physiological movement in the tissue surface due to heart rate or respiration of a person (or an animal) results in a Doppler shift in the frequency of the microwave signal that can be demodulated and filtered to obtain the rate of the fluctuation. Such rate corresponds to the rate of respiration or cardiac activity.

The robot 200 may further include a set of components collectively referred as a vehicle system 342. The vehicle system 342 may be associated with mechanics (including one or more of a chassis with two or four wheels, gearbox, drivetrain, motor, controller, transmission, and the like) and power source 224 to propel the robot 200 along a path.

The robot 200 may further include a communication interface 212 that can allow the robot 200 to communicate with external processors, such as a remote computer. Some examples of the communication interface 212 may include a modem, a physical communication interface (such as an Ethernet card or other Communication interface Card (NIC)), a virtual communication interface, a communications port, a Personal Computer Memory Card International Association (PCMCIA) slot and card, or the like. The wireless protocols enabled by communication interface 212 may include Wi-Fi™. Data transferred via communication interface 212 may be in the form of signals which may be electrical, electromagnetic, optical, or any other signal capable of being received by the external communications interface (collectively referred to as "messages"). These messages that may comprise data or instructions may be provided between communication interface 212 and other devices via a communications path or channel. Any suitable communication path or channel may be used such as, for instance, a wire, fiber optics, a cellular link, a radio frequency (RF) link, a WAN or LAN network, the Internet, advanced data network technology, such as 3G, 4G, EDGE (enhanced data rates for global evolution), WiFi (IEEE 802.XX family standards) or other mobile communication technologies, or any combination thereof.

According to various embodiments, the computer readable medium 208 may comprise code, executable by the processor 206, to implement a method comprising identifying, by a robot, a live subject within a predetermined distance of the robot; collecting, by the robot, sensor data by remotely measuring one or more physiological functions of the live subject, wherein the live subject is a person or an animal; determining, by the robot, an emotional state of the live subject using at least the sensor data; determining, by the robot, a robot action based on the emotional state of the live subject; providing, by the robot to an output device of the robot, an instruction to initiate the robot action; and performing, by the robot, the robot action using the output device.

In some embodiments, the method implemented by the processor may further include, after performing the robot action by the output device, continuing monitoring the live subject by receiving a stream of sensor data at predetermined intervals; determining a change in the sensor data associated with one or more physiological measurements of the live subject; determining a change in the emotional state of the live subject based on the change in the sensor data; determining a subsequent robot action based on the change in the emotional state of the live subject; providing, to the output device, an instruction to initiate the subsequent robot action; and performing the subsequent robot action using the output device.

Figure 3:
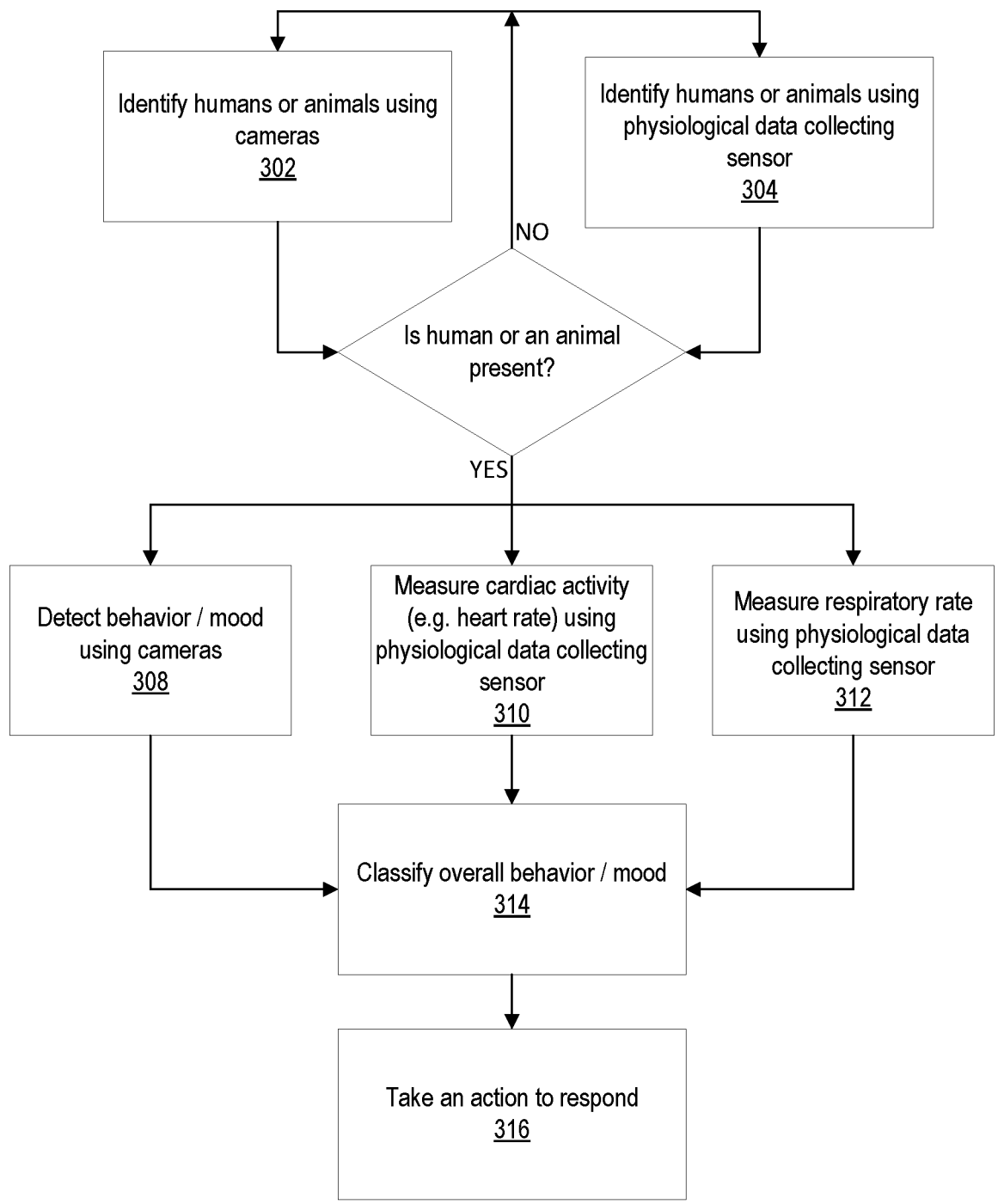
FIG. 3 illustrates an exemplary process for performing an action by the robot based on sensor data according to an embodiment of the disclosure.

FIG. 3 illustrates an exemplary process for performing an action by the robot based on sensor data according to an embodiment of the disclosure.

At step S302, the robot may identify humans or animals within a predetermined distance of the robot using one or more cameras coupled to the robot. The predetermined distance may be a preset distance (e.g. 5 meter radius).

At step S304, the robot may identify the presence of the persons or animals using the one or more physiological data collecting sensor coupled to the robot. The physiological data collecting sensors may collect data of living subjects within a predetermined field of view. The robot may keep repeating steps 302 and 304 until a human or an animal is detected nearby (e.g. in close proximity, within a predetermined perimeter, within the sensing rage of the one or more physiological data collecting sensor).

At step S308, once a human or an animal is detected, the robot may detect the behavior and/or the emotional state (e.g. mood) of the detected human or animal. For example, the robot may detect the mood by analyzing the facial features or body language captured by the cameras using computer vision algorithms.

At step S310, the robot may measure cardiac activity (e.g. heart rate) of the human or the animal in real time using the physiological data collecting sensors. At step S312, the robot may measure respiratory rate of the human or the animal in real time using the physiological data collecting sensors. Steps S310-S312 may be performed simultaneously or sequentially. Steps S310-S312 may be performed using the same physiological data collecting sensors or separate (respective) physiological data collecting sensors.

After collecting data using the cameras and/or physiological data collecting sensors, the robot may provide this data as an input to a trained machine learning algorithm. The machine learning algorithm may correlate the received data and classify the overall behavior and/or emotional state of the person or animal (step S314). The machine learning algorithm may then identify the robot action appropriate for the determined behavior and/or emotional state. For example, the robot's action may be identified by using a lookup table, heuristics, a deterministic approach or stochastic approach. Accordingly, the machine learning algorithm can also identify a probability associated with the identified emotional state and/or robot action. For example, the output provided by the trained machine learning algorithm may indicate that the person is in an agitated state, and that the robot should play their recording with an 80% probability. In some embodiments, the output of the algorithm may also include a confidence score that identifies a likelihood of the emotional state, feelings, and mood of the live subject.

According to various embodiments, the robot and/or the trained machine learning algorithm executing on an onboard computer of the robot, may be able to identify whether a person needs medical attention, if the person or the animal is scared to interact with the robot, and whether the physiological change (e.g. a change in the respiratory rate or heart rate) is a result of interacting with the robot, in which case the robot action may include contacting a human operator.

In some embodiments, the robot may identify that the person or animal within close proximity is in an aggressive emotional state. If the robot detects that the personal animal may attack the robot with a probability above a predetermined threshold, the robot may send a distress message to the remote operator and/or may activate the vehicle systems to move away from the person or the animal.

The robot may continuously monitor the physiological data of the person or animal during the entire interaction with the robot and identify as well as perform a series of robot actions to keep the person on a positive emotional state to the extent possible. Accordingly embodiments improve the acceptance of the robots and aim at improving the interaction between the robot and humans.

Figure 4:
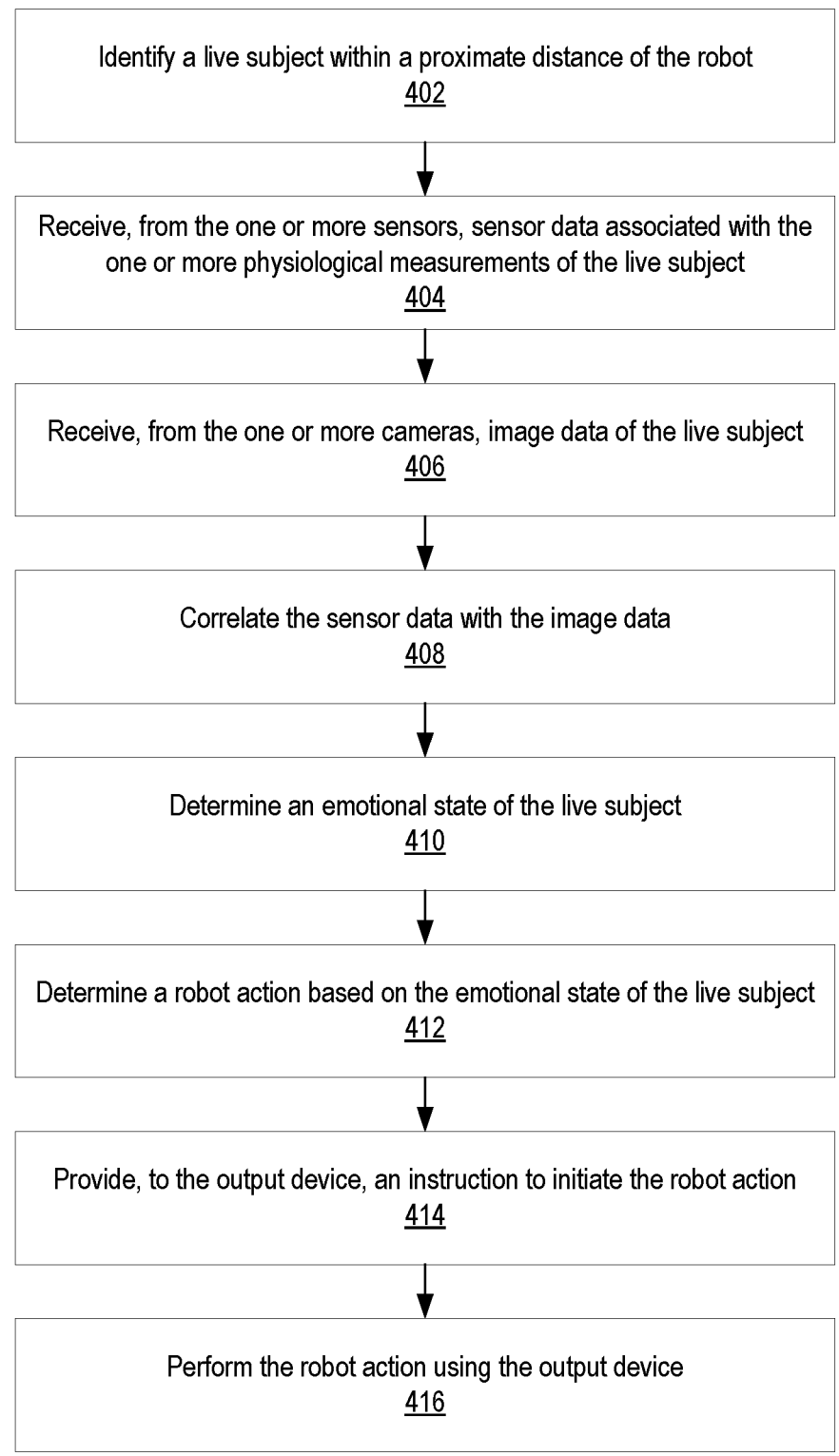
FIG. 4 illustrates a flowchart of steps performed by the robot to collect and act on physiological data collected using one or more sensors according to an embodiment of the disclosure.

FIG. 4 illustrates a flowchart of steps performed by the robot to collect and act on physiological data collected using one or more sensors according to an embodiment of the disclosure.

At step S402, the robot may identify a live subject (a person or an animal) within a predetermined distance of the robot. In some embodiments, the predetermined distance may be the sensing distance of the sensors coupled to the robot. Alternatively, the distance may be predetermined and programmed to the robot. For example, the robot may detect the live subjects within 5-meter radius of the robot. The robot may identify the presence of the live subject using a variety of components such as a camera associated with image recognition technology, acoustic sensors, infrared sensors, radar, and/or physiological data collecting sensors.

At step S404, the robot may receive sensor data from the one or more sensors. The sensor data may be associated with the one or more real time physiological measurements of the live subject including, but not limited to, heart rate, body temperature, breathing rate. At step S406, the robot may receive image data of the live subject from the one or more cameras coupled to the robot. For example, the image data may be used to identify whether the live subject is a person or an animal. In some embodiments, the image data may also be used in connection with computer vision algorithms to identify behavior cues of the live subject. At step S408, the robot (e.g. a trained machine learning model executing on the robot) may correlate the sensor data with the image data. The sensor data may undergo pre-processing (e.g. ground isolation, digitizing, discretization, etc.) before being fed into the machine learning model. Correlation of the sensor data with the image data may comprise time synchronization of the sensor data and the image data such that any image frame is associated with a known timestamp or temporal window within the sensor data. Such correlation may also comprise providing those data as inputs to a machine learning algorithm.

At step S410, the robot may determine the emotional state of the live subject using the trained machine learning model. According to various embodiments, the machine learning algorithm may identify an emotional state of the subject based on the correlated data. The emotional state may include, but is not limited to, a frustrated state, a neutral state, a happy state, an angry state, an agitated state, an aggressive state, an upset state, etc. Each emotional state may be associated with a set of physiological measurements, and can be identified using sensor data as well as image data.

As step S412, the machine learning model may determine a robot action based on the emotional state of the live subject. For example, the robot action may include, but is not limited to, activating a series of lights to imitate a human expression (e.g. smiling, winking, blinking) on a user interface displayed on the output device (e.g. a screen, a set of lights), contacting a remote operator (e.g. sending a message, calling), playing an audio file using the speakers of the robot, activating a vehicle system of the robot to move (e.g. move away from the live subject, move closer to the live subject), or powering off.

At step S414, the machine learning algorithm may provide an instruction to initiate the identified robot action. At step S416, the robot may perform the robot action using the output device (e.g. the speaker, the display device, the set of lights, the vehicle system, etc.). In some embodiments, the machine learning model may also determine a confidence score associated with the robot action. The robot may determine that the confidence score exceeds a threshold value prior to performing the robot action. For example, if the output of the trained machine learning model indicates that the robot action for the emotional state of the subject should be calling the remote operator or a customer service representative with a confidence level of 80%, the robot may perform the action (e.g. the threshold level may be 75%).

In some embodiments, the sensor data may identify a human or animal in distress, including, for example, a cardiac arrest identified by one or more sensors. In some examples, robot may determine the distress and contact the computer system (e.g. remote computing device 160 illustrated in FIG. 1) via the communication network to identify the human or animal in distress, or may contact a third party (e.g. police, ambulance) directly.

In some embodiments, one or more actions may be performed by robot to allow the object to connect emotionally with the robot. This may include allowing the live subject to personify or anthropomorphize the robot, including imitating winking or speaking with robot.

In some embodiments, one or more actions may be performed by the robot to avoid damage to the robot. For example, the sensor data may identify an angry dog or human that may be advancing toward the robot. In some examples, the action performed by the robot may include changing a direction of a path traversed by the robot.

According to various embodiments, the robot may continuously monitor the subject during an interaction. For example, the robot may collect a steam of sensor data at predetermined intervals (e.g. every 10 seconds) to identify changes in the physiological functions of the subject. Accordingly, the robot can effectively determine the change in the sensor data associated with one or more physiological functions, and determine a change in the emotional state of the subject. The robot may then identify appropriate robot action(s).

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A robot comprising:
   one or more sensors configured to collect sensor data by remotely measuring one or more physiological functions of at least one live subject;
   one or more output devices;
   one or more processors; and
   a non-transitory computer-readable medium including instructions that, when executed by the one or more processors, cause the one or more processors to:
      identify the at least one live subject within a predetermined distance of the robot;
      receive, from the one or more sensors, the sensor data associated with the one or more physiological functions of the at least one live subject;

determine an aggressive emotional state of the at least one live subject using at least the sensor data;
determine a robot action based on the aggressive emotional state of the at least one live subject;
provide, to the one or more output devices, an instruction to initiate the robot action; and
perform the robot action using the one or more output devices, wherein the robot action includes activating a vehicle system of the robot to move away from the at least one live subject upon determining, based at least in part on the aggressive emotional state of the at least one live subject, a threshold likelihood of the at least one live subject attacking the robot.

2. The robot of claim 1, wherein the aggressive emotional state of the at least one live subject and the robot action are determined using a machine learning model.

3. The robot of claim 1, wherein the robot action further includes one or more of activating a series of lights to imitate a human expression on a user interface displayed on the one or more output devices, contacting a remote operator, and playing an audio file.

4. The robot of claim 1, further comprising:
one or more video cameras,
wherein the instructions, when executed by the one or more processors, further cause the one or more processors to:
capture image data of the at least one live subject using the one or more video cameras;
correlate the sensor data with the image data; and
determine the aggressive emotional state of the at least one live subject using correlation between the sensor data and the image data.

5. The robot of claim 4, wherein the instructions, when executed by the one or more processors, further cause the one or more processors to:
determine the at least one live subject is a person or an animal using the image data.

6. The robot of claim 1, wherein the instructions, when executed by the one or more processors, further cause the one or more processors to:
after performing the robot action by the one or more output devices,
continue monitoring the at least one live subject by receiving a stream of sensor data at predetermined intervals;
determine a change in the sensor data associated with one or more physiological functions of the at least one live subject;
determine a change in the aggressive emotional state of the at least one live subject based on the change in the sensor data;
determine a subsequent robot action based on the change in the aggressive emotional state of the at least one live subject;
provide, to the one or more output devices, an instruction to initiate the subsequent robot action; and
perform the subsequent robot action using the one or more output devices.

7. The robot of claim 1, wherein receiving sensor data includes receiving a stream of sensor data at predetermined intervals during an interaction between the robot and the at least one live subject.

8. The robot of claim 1, wherein the instructions, when executed by the one or more processors, further cause the one or more processors to:
determine a confidence score associated with the robot action; and
determine that the confidence score exceeds a threshold value prior to performing the robot action.

9. The robot of claim 1, wherein the one or more physiological functions include one or more of a cardiac activity including a heart rate, a respiratory activity, or a body temperature.

10. The robot of claim 1, wherein the one or more sensors include:
a first sensor that uses microwave signals; and
a second sensor that uses one of Doppler signals, ultra-wideband signals, or electromagnetic radio-frequency (RF) signals to remotely measure the one or more physiological functions of the at least one live subject.

11. A computer-implemented method comprising:
identifying, by a robot, at least one live subject within a predetermined distance of the robot;
collecting, by the robot, sensor data by remotely measuring one or more physiological functions of the at least one live subject, wherein the at least one live subject is a person or an animal;
determining, by the robot, an aggressive emotional state of the at least one live subject using at least the sensor data;
determining, by the robot, a robot action based on the aggressive emotional state of the at least one live subject;
providing, by the robot to one or more output devices of the robot, an instruction to initiate the robot action; and
performing, by the robot, the robot action using the one or more output devices,
wherein upon determining, based at least in part on the aggressive emotional state of the at least one live subject, a threshold likelihood of the at least one live subject attacking the robot, the robot performs the robot action of activating a vehicle system of the robot to move away from the at least one live subject.

12. The computer-implemented method of claim 11, wherein the aggressive emotional state of the at least one live subject and the robot action are determined using a machine learning model.

13. The computer-implemented method of claim 11, wherein the robot action further includes one or more of activating a series of lights to imitate a human expression on a user interface displayed on the one or more output devices, contacting a remote operator, and playing an audio file.

14. The computer-implemented method of claim 11, further comprising:
capturing, by one or more video cameras of the robot, image data of the at least one live subject;
correlating the sensor data with the image data; and
determining the aggressive emotional state of the at least one live subject using correlation between the sensor data and the image data.

15. The computer-implemented method of claim 14, further comprising:
determining the at least one live subject is a person or an animal using the image data.

16. The computer-implemented method of claim 11, further comprising:
after performing the robot action by the one or more output devices,
continuing monitoring the at least one live subject by receiving a stream of sensor data at predetermined intervals;
determining a change in the sensor data associated with one or more physiological functions of the at least one live subject;

determining a change in the aggressive emotional state of the at least one live subject based on the change in the sensor data;

determining a subsequent robot action based on the change in the aggressive emotional state of the at least one live subject;

providing, to the one or more output devices, an instruction to initiate the subsequent robot action; and performing the subsequent robot action using the one or more output devices.

17. The computer-implemented method of claim 11, wherein receiving sensor data includes receiving a stream of sensor data at predetermined intervals during an interaction between the robot and the at least one live subject.

18. The computer-implemented method of claim 11, further comprising:

determining a confidence score associated with the robot action; and determining that the confidence score exceeds a threshold value prior to performing the robot action.

19. The computer-implemented method of claim 11, wherein the one or more physiological functions include one or more of a cardiac activity including a heart rate, a respiratory activity, or a body temperature.

20. The computer-implemented method of claim 11, wherein collecting the sensor data includes using microwave signals, Doppler signals, ultra-wideband signals, or electromagnetic radio-frequency (RF) signals to remotely measure the one or more physiological functions of the at least one live subject.

* * * * *